(12) United States Patent
Spirovski et al.

(10) Patent No.: US 9,719,559 B1
(45) Date of Patent: Aug. 1, 2017

(54) PRELOADED BEARING ASSEMBLY

(71) Applicant: Schaeffler Technologies AG & Co. KG, Herzogenaurach (DE)

(72) Inventors: Majkol Spirovski, Macomb Township, MI (US); Rajesh Shanbhag, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/152,895

(22) Filed: May 12, 2016

(51) Int. Cl.
  *F16C 19/38* (2006.01)
  *F16C 19/36* (2006.01)
  *F16C 33/58* (2006.01)

(52) U.S. Cl.
  CPC ............ *F16C 19/38* (2013.01); *F16C 19/364* (2013.01); *F16C 33/58* (2013.01)

(58) Field of Classification Search
  CPC ........ F16C 19/38; F16C 19/364; F16C 33/58; F16C 19/545; F16C 21/00; F16C 21/005; F16C 2229/00
  See application file for complete search history.

(56) References Cited

U.S. PATENT DOCUMENTS

| | | | | |
|---|---|---|---|---|
| 1,457,184 | A * | 5/1923 | Munson | B60B 27/0005 384/544 |
| 2,155,897 | A * | 4/1939 | Goldsworthy | F16C 19/385 29/898.07 |
| 7,344,313 | B2 | 3/2008 | Hansen et al. | |
| 2005/0031241 | A1 | 2/2005 | Obara | |
| 2008/0298732 | A1* | 12/2008 | Gradu | F16C 19/38 384/452 |
| 2014/0216172 | A1 | 8/2014 | Katsaros | |

* cited by examiner

*Primary Examiner* — Thomas R. Hannon
(74) *Attorney, Agent, or Firm* — Volpe and Koenig, P.C.

(57) ABSTRACT

A rolling bearing assembly including a nut for providing a preload is disclosed. A first plurality of rolling elements is supported between an inner bearing ring and an outer bearing ring. A first one of the inner bearing ring or the outer bearing ring includes an extension in an axial direction including a first engagement surface, and a second one of the inner bearing ring or the outer bearing ring includes a first axial end face defining a first axial bearing surface. A nut includes a second engagement surface configured to matingly engage with the first engagement surface, and a second axial end face of the nut defines a second axial bearing surface. The first axial bearing surface and the second axial bearing surface form an axial bearing.

13 Claims, 10 Drawing Sheets

PRELOADED BEARING ASSEMBLY

FIELD OF INVENTION

The present invention relates to a bearing assembly and is more particularly related to a preloaded bearing assembly.

BACKGROUND

Rolling bearing assemblies are used in a wide range of applications. Some known varieties of rolling bearing assemblies according to the prior art are shown in FIGS. 1-3. FIG. 1 illustrates a single-row angular contact bearing 100, FIG. 2 illustrates a double-row angular contact bearing 200, and FIG. 3 illustrates a tapered rolling bearing assembly 300. In certain applications, known rolling bearing assemblies require setting a bearing preload, which affects contact between the rolling bearing assembly running surfaces and influences service life of the bearing assembly. Setting the bearing preload is often a costly and time-consuming process due to the precision required to ensure that the associated bearing runs efficiently. Bearing preload loss can occur when the associated bearing is mounted in a housing formed from a material with a high thermal coefficient of expansion, such as aluminum.

Known bearing preload elements include using preload springs, however these preload springs require complex calculations to determine the required biasing force for providing an adequate preload. Other known bearing preload arrangements include a nut having threading that is threaded onto a corresponding threaded shaft or axle, or is threaded onto a separately formed adapter sleeve, such as shown in U.S. Pub. 2005/0031241, U.S. Pub. 2014/0216172, and U.S. Pat. No. 7,344,313, with the nut acting directly or indirectly against one of the bearing rings to press it toward the other bearing ring. These known preload arrangements require a more complicated installation process because the nut must be installed directly onto a threaded axle or shaft, installed on a separately formed adapter sleeve, and/or require additional intermediate components and a preload measuring device.

It would be desirable to provide a simplified preload bearing arrangement that does not require installation of the preload nut directly on a shaft or axle, and does not require additional components between the bearing rings and the nut.

SUMMARY

A preload rolling bearing assembly including a nut that is directly engaged with a bearing ring is provided. The rolling bearing assembly includes a first plurality of rolling elements supported between an inner bearing ring and an outer bearing ring. A first one of the inner bearing ring or the outer bearing ring includes an extension in an axial direction including a first engagement surface, and a second one of the inner bearing ring or the outer bearing ring includes a first axial end face defining a first axial bearing surface. The nut includes a second engagement surface configured to matingly engage with the first engagement surface, and a second axial end face of the nut defines a second axial bearing surface. The first axial bearing surface and the second axial bearing surface form an axial bearing. The nut lockingly engages with the first one of the inner bearing ring or the outer bearing ring, and applies an axial preload to the second one of the inner bearing ring or the outer bearing ring.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
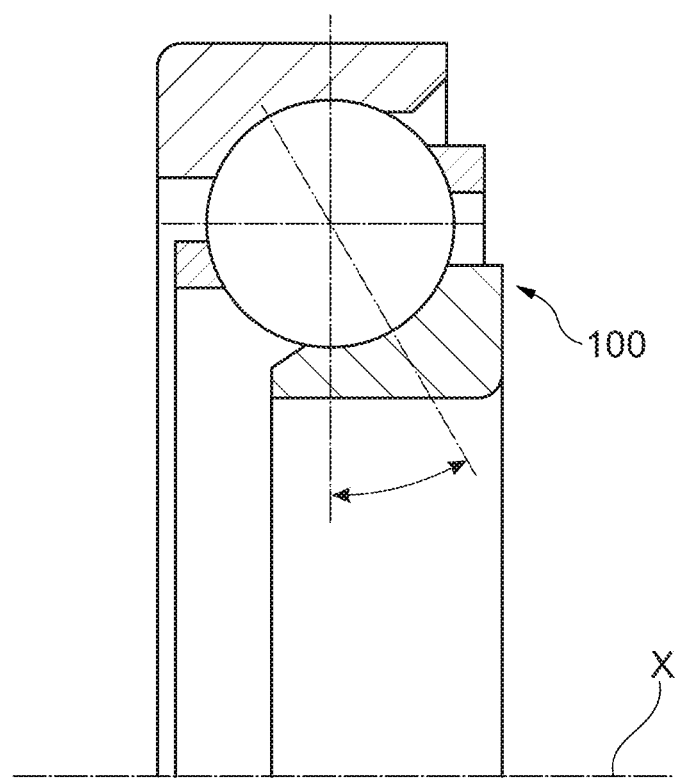
FIG. 1 is a cross-sectional view of a single-row angular contact bearing according to the prior art.
Figure 2:
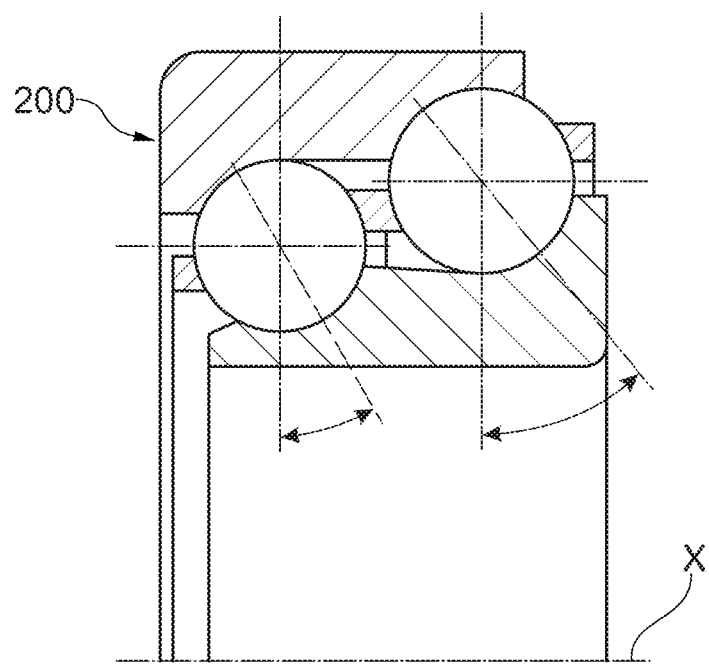
FIG. 2 is a cross-sectional view of a double-row angular contact bearing according to the prior art.
Figure 3:
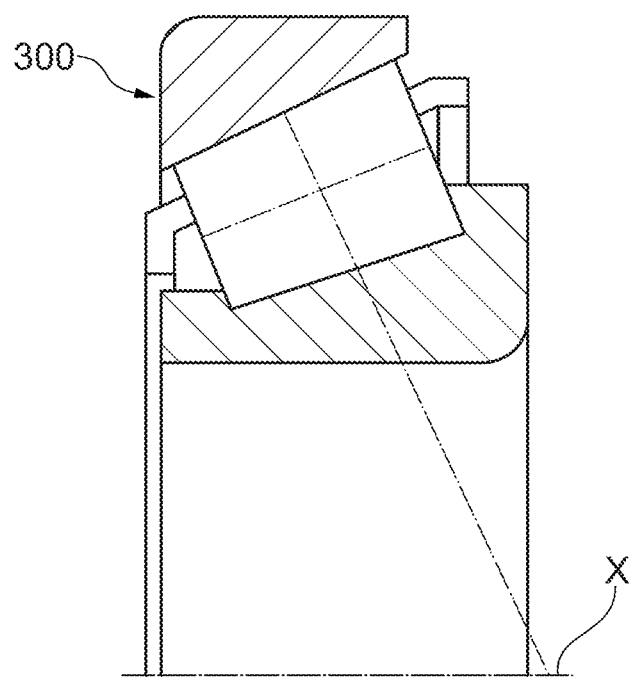
FIG. 3 is a cross-sectional view of a tapered rolling bearing according to the prior art.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 4:
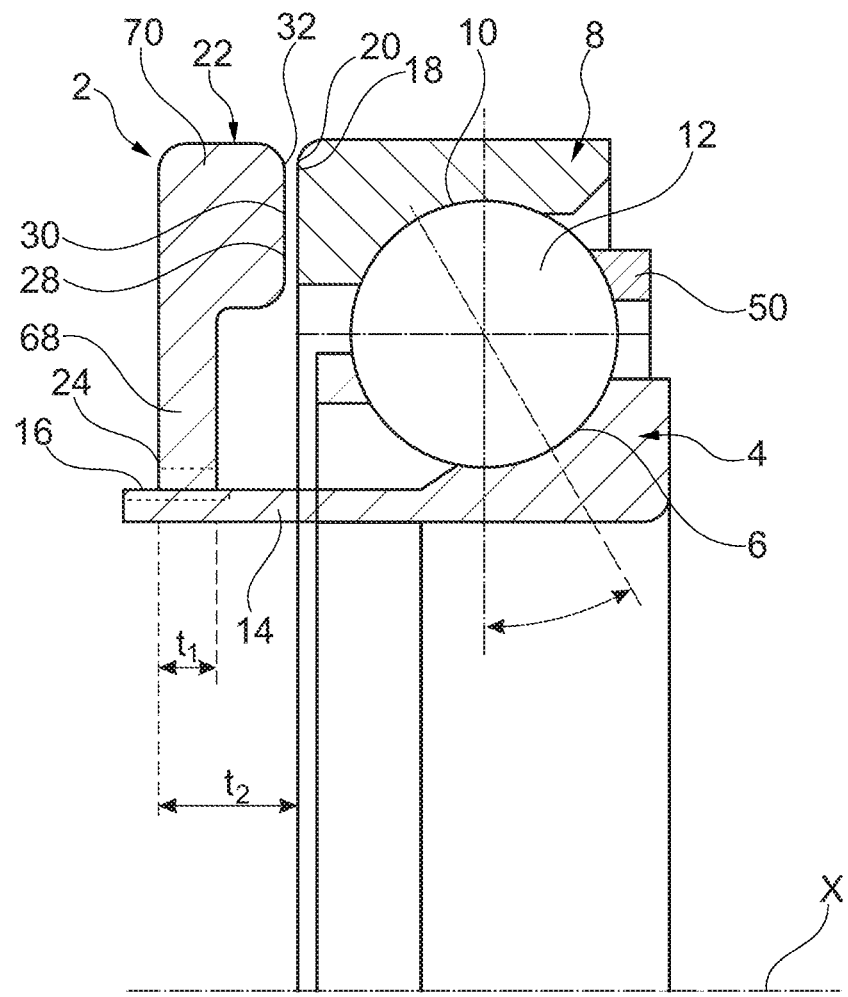
FIG. 4 is a cross-sectional view of a first embodiment of a preloaded rolling bearing assembly including a preloading nut, an engagement surface defined on an inner bearing ring, and a plain bearing axial bearing.

A first embodiment of a rolling bearing assembly 2 including a nut 22 for providing a preload is shown in FIG. 4. The rolling bearing assembly 2 includes an inner bearing ring 4 defining a first inner race 6 and an outer bearing ring 8 defining a first outer race 10. A first plurality of rolling elements 12 are supported between the inner bearing ring 4 and the outer bearing ring 8, and the first plurality of rolling elements 12 run on the first inner race 6 and the first outer race 10. As shown in FIG. 4, preferably a first cage 50 retains the first plurality of rolling elements 12 in circumferentially spaced-apart positions relative to one another.

Figure 6:
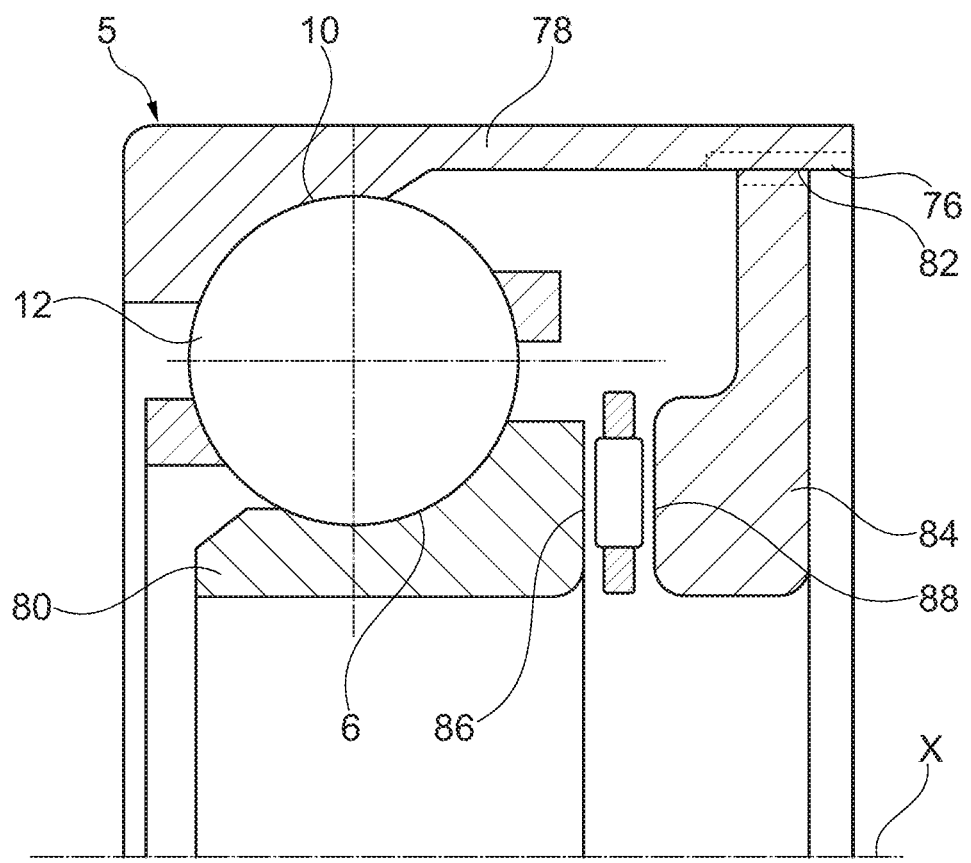
FIG. 6 is a cross-sectional view of a third embodiment of a preloaded rolling bearing assembly including a preloading nut and an engagement surface defined on an outer bearing ring.
Figure 8:
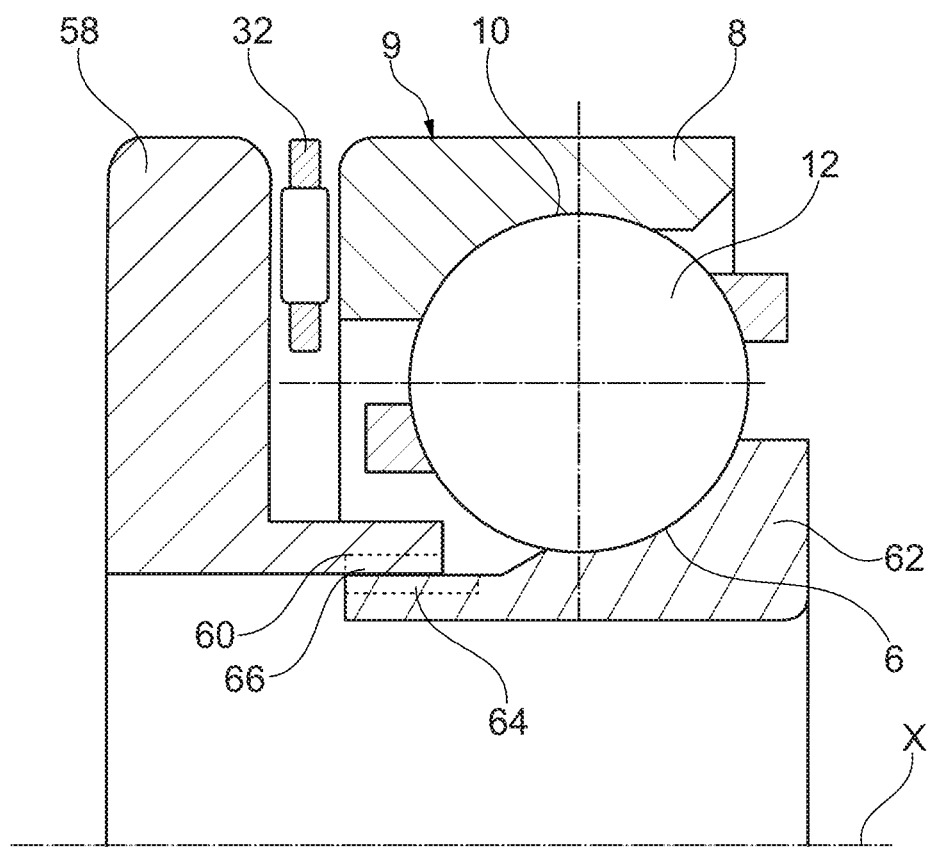
FIG. 8 is a cross-sectional view of a fifth embodiment of a preloaded rolling bearing assembly including a preloading nut with an extension in an axial direction that defines an engagement surface.

A first one of the inner bearing ring 4 or the outer bearing ring 8 includes an extension 14 in an axial direction including a first engagement surface 16, and a second one of the inner bearing ring 4 or the outer bearing ring 8 includes a first axial end face 18 defining a first axial bearing surface 20. As shown in FIG. 4, the first engagement surface 16 in this embodiment is defined on the inner bearing ring 4 and the first axial bearing surface 20 is defined on the outer bearing ring 8. One of ordinary skill in the art will recognize from the present application that alternative positions and configurations of the first engagement surface 16 and the first axial bearing surface 20 are possible, for example as shown in FIGS. 6 and 8, which are discussed in more detail below.

The nut 22 includes a second engagement surface 24 configured to matingly engage with the first engagement surface 16, and a second axial end face 28 defining a second axial bearing surface 30. The first axial bearing surface 20 and the second axial bearing surface 30 form an axial bearing 32. The axial bearing 32 of the rolling bearing assembly 2 shown in FIG. 4 is formed as a plain bearing. One of ordinary skill in the art will recognize from the present application that alternative axial bearing arrangements can be used, such as shown in FIGS. 5-10, with rolling elements located between the first and second axial bearing surfaces 20, 30.

The nut 22 is preferably threaded onto the inner bearing ring 4, and the axial bearing 32 transfers an axial load between the nut 22 and the outer bearing ring 8 as the nut 22 is engaged with the inner bearing ring 4. The preload of the rolling bearing assembly 2 is increased by further axial engagement of the nut 22 with the inner bearing ring 4. The first engagement surface 16 and the second engagement surface 24 each preferably include self-locking threading, such that the nut 22 is prevented from rotating backwards and causing bearing preload loss. Alternatively, a locking element, such as a plastic insert or lock wire can be used. In another embodiment, the first engagement surface 16 and the second engagement surface 24 include smooth surfaces that form an interference fit by axially pressing the nut 22 into frictional engagement with the inner bearing ring 4.

As shown in FIG. 4, a first nut region 68 of the nut 22 includes the second engagement surface 24, and a second nut region 70 of the nut 22 includes the second axial bearing surface 30. The second nut region 70 has a second thickness t2 that is greater than the first thickness $t_1$ of the first nut region 68 such that the nut 22 is adjustable on the extension 14 to allow preload of the rolling bearing assembly 2 to be adjusted.

Figure 9:
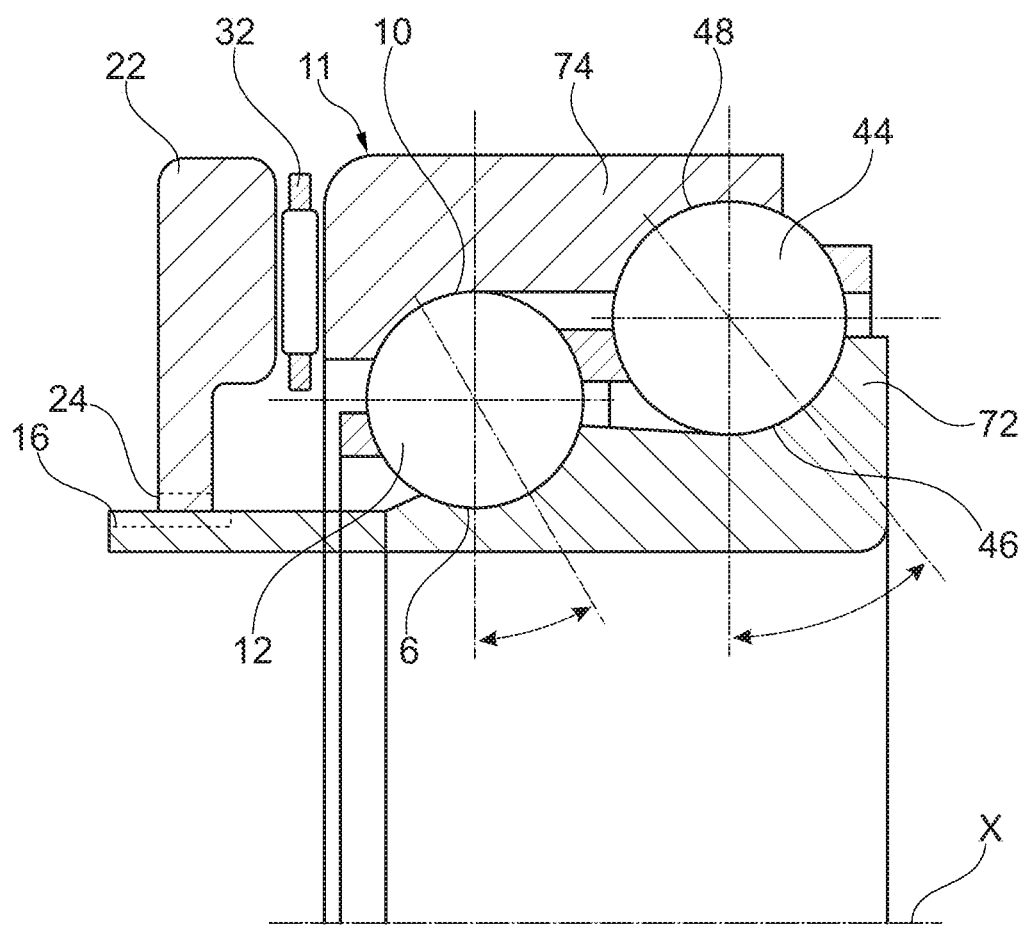
FIG. 9 is a cross-sectional view of a sixth embodiment of a preloaded rolling bearing assembly including a preloading nut and having a double-row rolling element arrangement.
Figure 10:
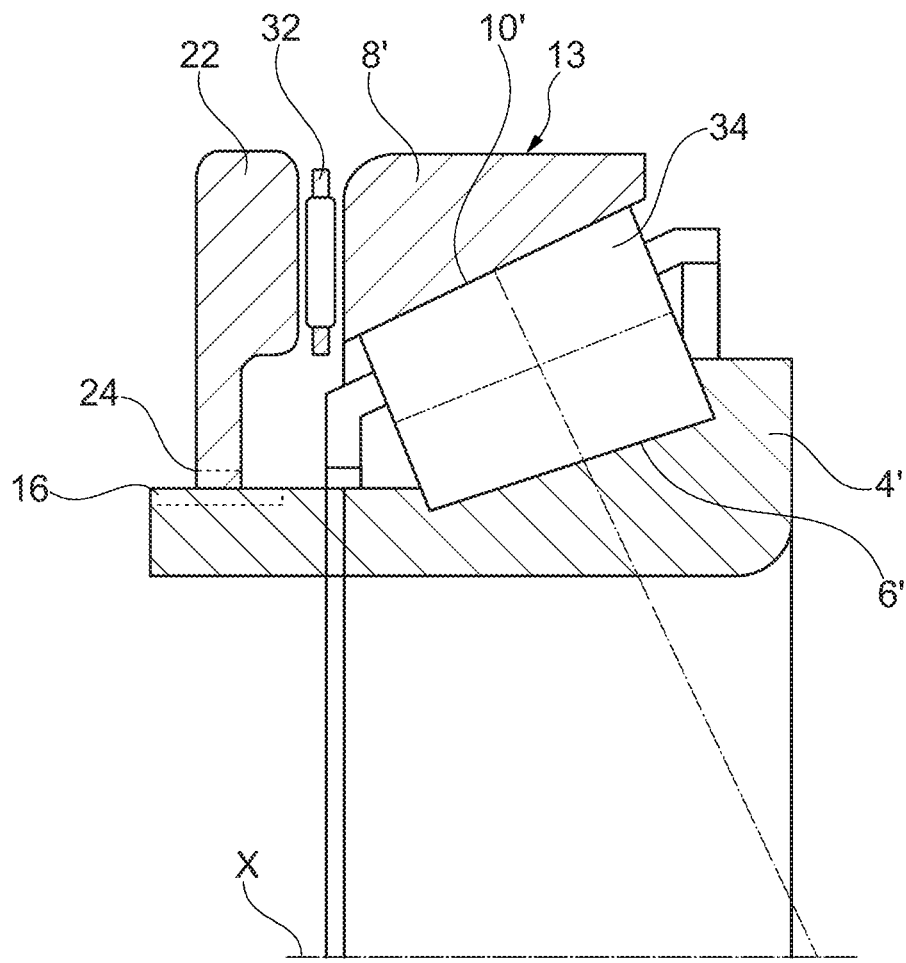
FIG. 10 is a cross-sectional view of a seventh embodiment of a preloaded rolling bearing assembly including a preloading nut and tapered rolling elements.

The first embodiment of the rolling bearing assembly 2 shown in FIG. 4 is a single-row angular contact rolling bearing. One of ordinary skill in the art will recognize from the present disclosure that the nut 22 and preload configuration of the first embodiment could be used in alternative rolling bearing assemblies, for example a double-row angular contact assembly or a tapered bearing assembly, as discussed below and as shown in FIGS. 9 and 10, respectively.

Figure 5:
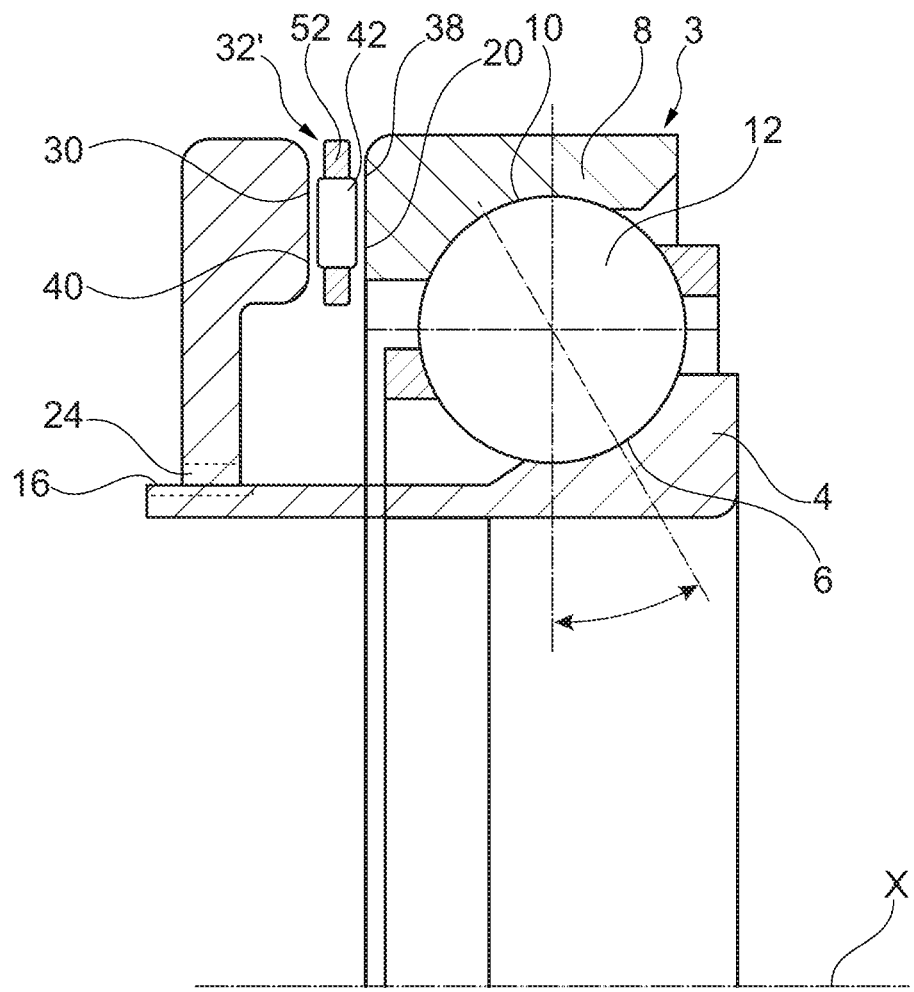
FIG. 5 is a cross-sectional view of a second embodiment of a preloaded rolling bearing assembly including a preloading nut and an axial bearing including rolling elements.

A second embodiment of the rolling bearing assembly 3 is shown in FIG. 5 that is the same as the first embodiment of the rolling bearing assembly 2 except that a second embodiment of an axial bearing 32' is provided. The second embodiment of the axial bearing 32' is formed by the first axial bearing surface 20 defining a first axial race 38, the second axial bearing surface 30 defining a second axial race 40, a plurality of cylindrical rolling elements 42 supported between the first axial bearing surface 20 and the second axial bearing surface 30, and the plurality of cylindrical rolling elements 42 running on the first axial race 38 and the second axial race 40. Cylindrical rolling elements 42 are shown in FIG. 5, however one of ordinary skill in the art will recognize from the present application that other rolling elements could be used. As shown in FIG. 5, a second cage 52 preferably retains the plurality of cylindrical rolling elements 42 in positions that are circumferentially spaced apart from one another.

A third embodiment of the rolling bearing assembly 5 is shown in FIG. 6 that is the same as the first and second embodiments of the rolling bearing assembly 2, 3 except that the first engagement surface 76 is defined on the outer bearing ring 78 instead of the inner bearing ring 80. The second engagement surface 82 of the nut 84 engages the first engagement surface 76. The first axial bearing surface 86 is defined on the inner bearing ring 80 and the second axial bearing surface 88 is defined on the nut 84. Similar to the first embodiment of the rolling bearing assembly 2, the bearing preload is achieved via screwing the nut 84 on to the outer bearing ring 78.

Figure 7:
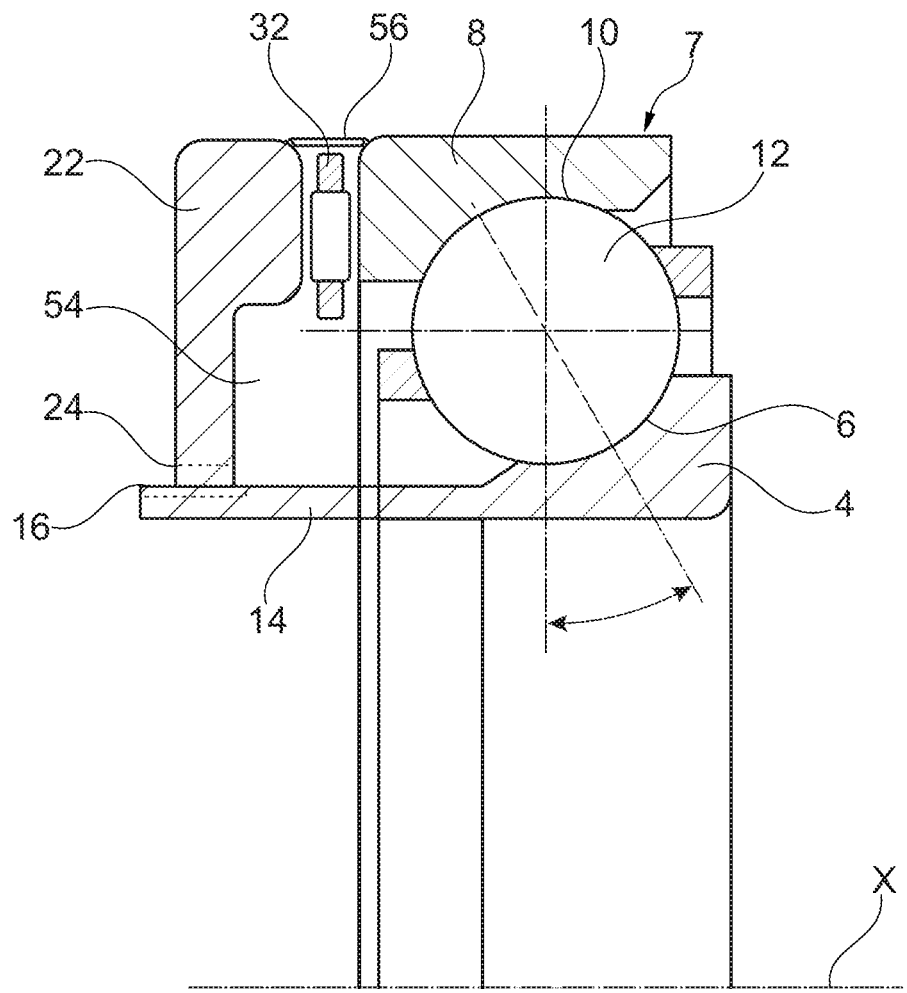
FIG. 7 is a cross-sectional view of a fourth embodiment of a preloaded rolling bearing assembly including a preloading nut and a lubricant reservoir defined between the nut, the inner bearing ring, and the outer bearing ring.

A fourth embodiment of the rolling bearing assembly 7 is shown in FIG. 7 that is the same as the second embodiment of the rolling bearing assembly 3 except that a lubricant reservoir 54 is provided. The lubricant reservoir 54 is defined between the nut 22, the extension 14, the inner bearing ring 4, the outer bearing ring 8, the first plurality of rolling elements 12, and the axial bearing 32. As shown in FIG. 7, a seal 56 extends between the nut 22 and the outer bearing ring 8 which prevents lubricant from exiting the lubricant reservoir 54. Lubricant from the lubricant reservoir 54 is supplied to the support surfaces of the axial bearing 32 and the bearing rings 4, 8 to improve efficiency of the rolling bearing assembly 7.

A fifth embodiment of the rolling bearing assembly 9 is shown in FIG. 8 that is the same as the second embodiment of the rolling bearing assembly 3 except the inner bearing ring 62 lacks an axial extension, and instead the nut 58 includes an extension 60 that extends in an axial direction and is aligned in a radially extending plane with at least a portion of the inner bearing ring 62 and at least a portion of the outer bearing ring 8. As shown in FIG. 8, the inner bearing ring 62 includes the first engagement surface 64 and the extension 60 of the nut 58 includes the second engagement surface 66.

A sixth embodiment of the rolling bearing assembly 11 is shown in FIG. 9 that is the same as the second embodiment of the rolling bearing assembly 3 except the rolling bearing assembly 11 includes a double-row bearing configuration. As shown in FIG. 9, the rolling bearing assembly 11 includes an inner bearing ring 72 with a first plurality of rolling elements 12 received between the first inner race 6 and the first outer race 10. The inner bearing ring 72 includes a second inner race 46, the outer bearing ring 74 includes a second outer race 48, and a second plurality of rolling elements 44 run on the second inner race 46 and the second outer race 48.

A seventh embodiment of the rolling bearing assembly 13 is shown in FIG. 10 that is the same as the second embodiment of the rolling bearing 3 except the rolling bearing assembly 13 includes tapered rolling elements 34 instead of spherical rolling elements. The inner bearing ring 4' defines an inner race 6' for the rolling elements 34, and the outer bearing ring 8' defines an outer race 10' for the rolling elements 34.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rolling bearing assembly:
   an inner bearing ring defining a first inner race;
   an outer bearing ring defining a first outer race;
   a first plurality of rolling elements supported between the inner bearing ring and the outer bearing ring, the first plurality of rolling elements running on the first inner race and the first outer race;
   a first one of the inner bearing ring or the outer bearing ring includes an extension in an axial direction including a first engagement surface, and a second one of the inner bearing ring or the outer bearing ring includes a first axial end face defining a first axial bearing surface; and
   a nut including a second engagement surface configured to matingly engage with the first engagement surface, and a second axial end face defining a second axial bearing surface; and
   the first axial bearing surface and the second axial bearing surface form an axial bearing, wherein a first nut region of the nut includes the second engagement surface, and a second nut region of the nut includes the second axial bearing surface, and the second nut region has a greater thickness than the first nut region.

2. The rolling bearing assembly of claim 1, wherein the first plurality of rolling elements includes tapered rolling elements.

3. The rolling bearing assembly of claim 1, wherein the rolling bearing assembly is an angular contact rolling bearing.

4. The rolling bearing assembly of claim 1, wherein a first cage retains the first plurality of rolling elements circumferentially spaced apart from one another.

5. The rolling bearing assembly of claim 1, wherein the first axial bearing surface defines a first axial race, the second axial bearing surface defines a second axial race, the assembly further comprising: a plurality of cylindrical rolling elements supported between the first axial bearing surface and the second axial bearing surface, and the plurality of cylindrical rolling elements run on the first axial race and the second axial race.

6. The rolling bearing assembly of claim 5, further comprising a second cage that retains the plurality of cylindrical rolling elements circumferentially spaced apart from one another.

7. The rolling bearing assembly of claim 1, further comprising a second plurality of rolling elements, the inner bearing ring including a second inner race, the outer bearing ring including a second outer race, and the second plurality of rolling elements run on the second inner race and the second outer race.

8. The rolling bearing assembly of claim 1, wherein the first engagement surface is defined on the inner bearing ring.

9. The rolling bearing assembly of claim 1, wherein the first engagement surface is defined on the outer bearing ring.

10. The rolling bearing assembly of claim 1, wherein a lubricant reservoir is defined between the nut, the extension, the inner bearing ring, the outer bearing ring, the first plurality of rolling elements, and the axial bearing.

11. The rolling bearing assembly of claim 1, wherein the first and second engagement surfaces engage each other with an interference fit.

12. A rolling bearing assembly:
   an inner bearing ring defining a first inner race;
   an outer bearing ring defining a first outer race;
   a first plurality of rolling elements supported between the inner bearing ring and the outer bearing ring, the first plurality of rolling elements running on the first inner race and the first outer race;
   a first one of the inner bearing ring or the outer bearing ring includes an extension in an axial direction including a first engagement surface, and a second one of the inner bearing ring or the outer bearing ring includes a first axial end face defining a first axial bearing surface; and
   a nut including a second engagement surface configured to matingly engage with the first engagement surface, and a second axial end face defining a second axial bearing surface; and
   the first axial bearing surface and the second axial bearing surface form an axial bearing, wherein a lubricant reservoir is defined between the nut, the extension, the inner bearing ring, the outer bearing ring, the first plurality of rolling elements, and the axial bearing, and a seal extends between the nut and the second one of the inner bearing ring or the outer bearing ring.

13. A rolling bearing assembly:
   an inner bearing ring defining a first inner race;
   an outer bearing ring defining a first outer race;
   a first plurality of rolling elements supported between the inner bearing ring and the outer bearing ring, the first plurality of rolling elements running on the first inner race and the first outer race;
   a first one of the inner bearing ring or the outer bearing ring includes an extension in an axial direction including a first engagement surface, and a second one of the inner bearing ring or the outer bearing ring includes a first axial end face defining a first axial bearing surface; and
   a nut including a second engagement surface configured to matingly engage with the first engagement surface, and a second axial end face defining a second axial bearing surface; and
   the first axial bearing surface and the second axial bearing surface form an axial bearing, wherein the first engagement surface and the second engagement surface each include threading configured to matingly engage with each other.

* * * * *